United States Patent
Yao et al.

(10) Patent No.: US 12,388,365 B2
(45) Date of Patent: Aug. 12, 2025

(54) AUXILIARY CIRCUIT OF POWER CONVERTER AND DRIVING CIRCUIT

(71) Applicant: Silergy Semiconductor Technology (Hangzhou) LTD, Hangzhou (CN)

(72) Inventors: Kaiwei Yao, Sunnyvale, CA (US); David Tournatory, Redwood City, CA (US); Mike Grimm, Los Altos Hills, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 437 days.

(21) Appl. No.: 18/079,132

(22) Filed: Dec. 12, 2022

(65) Prior Publication Data
US 2023/0198392 A1   Jun. 22, 2023

(30) Foreign Application Priority Data
Dec. 22, 2021   (CN) ........................ 202111582598.6

(51) Int. Cl.
*H02M 3/156*   (2006.01)
*H02M 1/00*    (2006.01)
*H02M 1/088*   (2006.01)

(52) U.S. Cl.
CPC ....... *H02M 3/1566* (2021.05); *H02M 1/0095* (2021.05); *H02M 1/088* (2013.01)

(58) Field of Classification Search
CPC ........................... H02M 3/156; H02M 3/1566
See application file for complete search history.

(56) References Cited

U.S. PATENT DOCUMENTS

| | | | |
|---|---|---|---|
| 8,581,518 B2 | 11/2013 | Kuang et al. | |
| 10,511,234 B2* | 12/2019 | Zhang | .............. H02M 7/537 |
| 10,743,382 B1* | 8/2020 | Xiong | ............... H05B 45/305 |
| 2011/0127925 A1 | 6/2011 | Huang et al. | |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |

FOREIGN PATENT DOCUMENTS

| | | | |
|---|---|---|---|
| CN | 105871181 B | 8/2016 | |
| EP | 2871758 A1 * | 5/2015 | .............. H02M 1/15 |

\* cited by examiner

*Primary Examiner* — Gary A Nash

(57) ABSTRACT

An auxiliary circuit of a power converter is disclosed, where: the auxiliary circuit is coupled to a load of the power converter; and the auxiliary circuit is configured to generate an auxiliary current provided to the load, in order to limit a variation range of a load voltage of the load when a variation of an output signal of the power converter is greater than a predetermined value.

20 Claims, 12 Drawing Sheets

AUXILIARY CIRCUIT OF POWER CONVERTER AND DRIVING CIRCUIT

RELATED APPLICATIONS

This application claims the benefit of Chinese Patent Application No. 202111582598.6, filed on Dec. 22, 2021, which is incorporated herein by reference in its entirety.

FIELD OF THE INVENTION

The present invention generally relates to the field of power electronics, and more particularly to auxiliary circuits of power converters, and associated driving circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

When an output port of a power converter is coupled with a load with high current slew rate (e.g., central processing unit [CPU]), strict voltage regulation is required, so an output capacitor with larger capacity and small parasitic value may be required. However, a capacitor with a relatively large capacitance value has great parasitic effect, and a capacitor with small parasitic value has small relatively capacitance value. Therefore, in some approaches, different kinds of capacitors are usually used together to attenuate the impedance in different operating frequency ranges, such that the impedance in the whole operating frequency range is small enough to keep the strict voltage regulation. However, when the current through the load is very high and the current slew rate (di/dt) is also very high, it can be difficult to find suitable capacitor elements. Moreover, due to limitations of the physical space and area of the integrated circuit, sufficient high-frequency capacitors approaching the load to attenuate the high-frequency impedance may not be accommodated.

Figure 1:
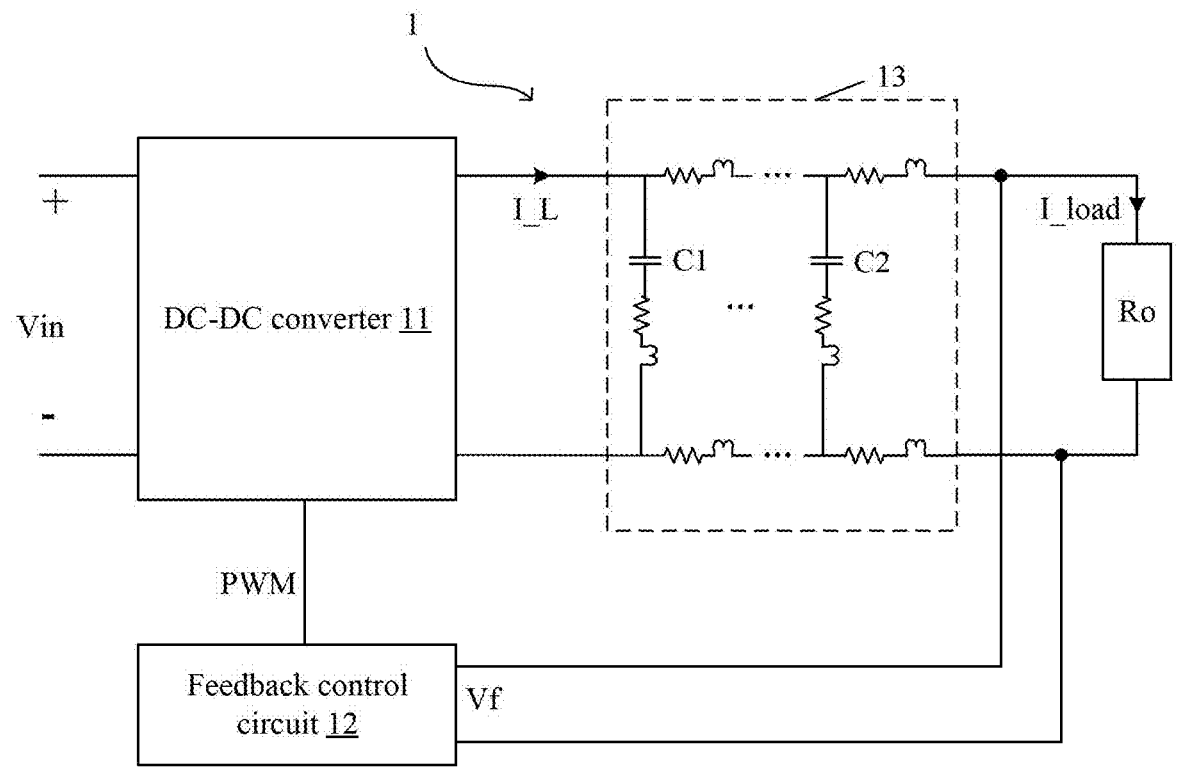
FIG. 1 is a schematic circuit diagram of an example driving circuit.
Figure 2:
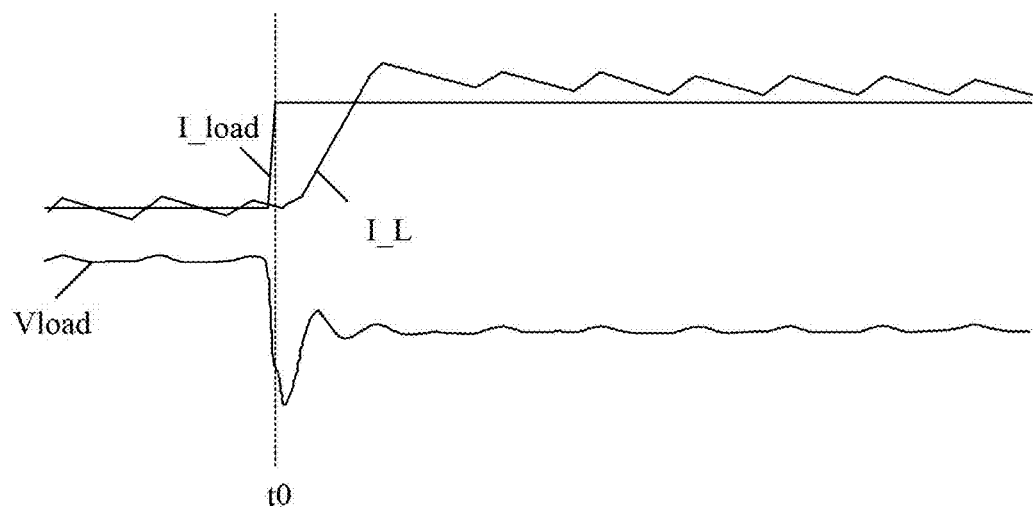
FIG. 2 is a waveform diagram of an example operation of a driving circuit.

Referring now to FIG. 1, shown is a schematic circuit diagram of an example driving circuit. Referring also to FIG. 2, shown is a waveform diagram of an example operation of a driving circuit. In FIG. 1, driving circuit 1 can include DC-DC converter 11, feedback control circuit 12, and power transmission network 13. DC-DC converter 11 may perform power conversion based on input voltage Vin to drive load Ro. Feedback control circuit 12 can receive feedback signal Vf of load Ro, and may generate control signal pulse-width modulation (PWM) based on feedback signal Vf to adjust the output power of DC-DC converter 11. The output current of DC-DC converter 11 is I_L. Power transmission network 13 can be formed by different types of capacitors (e.g., C1 and C2), and the parasitic resistance and the parasitic inductor in the power transmission path. Different types of capacitors may be used to attenuate impedance in different frequency ranges.

In some approaches, in order to keep load voltage Vload at both ends of load Ro with large step current variation and fast slew rate stable, the output filter capacitor with a relatively large capacity and small parasitism is typically used to adjust load voltage Vload at both ends of load Ro. Moreover, because the capacitor with large capacitance value has great parasitic effect (e.g., an aluminum capacitor), and the capacitor with small parasitic value has small capacitance value (e.g., a ceramic capacitor), different types of capacitors may typically be used together to attenuate the impedance in different operating frequency ranges. As such, the impedance in the whole operating frequency range is small enough to keep strict voltage regulation, thus maintaining the stability of load voltage.

However, when load current I_load becomes larger and larger, and the current slew rate faster and faster, it can be increasingly difficult to match various types of capacitors. Further, the limitation of the physical space and area may not allow too many capacitors to approach the load. If the strict voltage regulation cannot be maintained, load voltage Vload at both ends of the load can have a voltage spike. As shown in FIG. 2, at time t0, load current I_load changes greatly, and load voltage Vload drops sharply, resulting in a voltage spike, which may lead to the load failure or the large power loss. Therefore, particular embodiments provide an auxiliary circuit of a power converter to limit the variation range of the load voltage by generating an auxiliary current, in order to better adjust the load voltage, keep the stability of the load voltage, reduce the power loss, and improve the operating efficiency.

Figure 3:
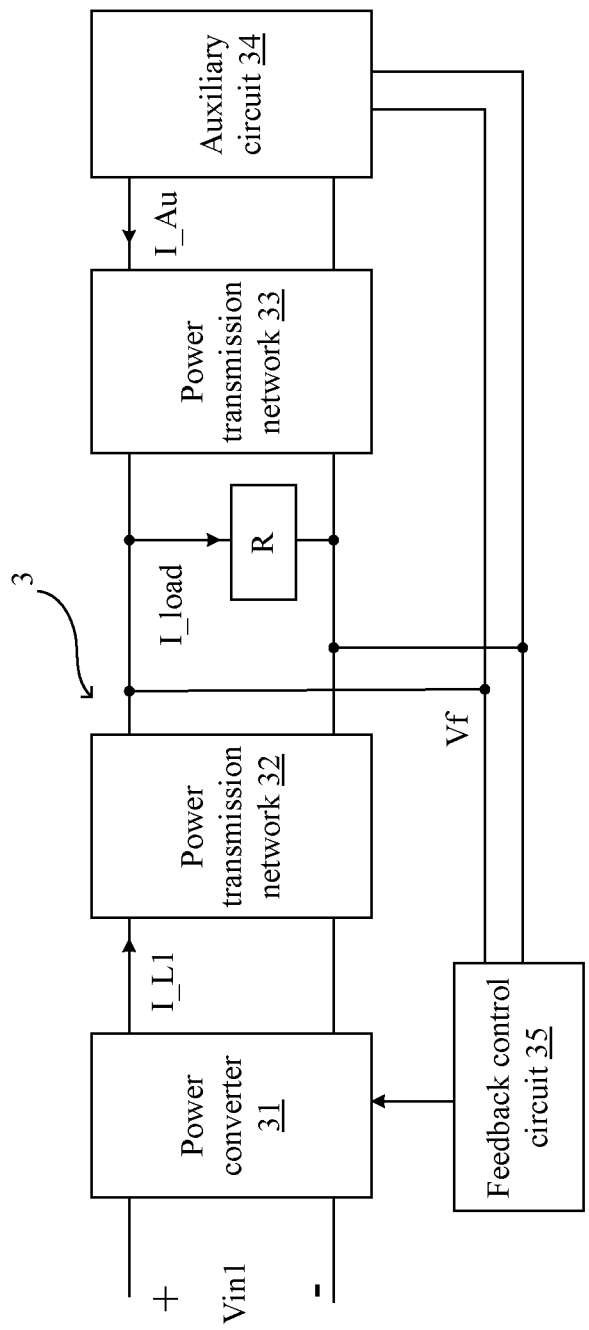
FIG. 3 is a schematic circuit diagram of an example driving circuit, in accordance with embodiments of the preset invention.

Referring now to FIG. 3, shown is a schematic circuit diagram of an example driving circuit, in accordance with embodiments of the preset invention. In this particular example, driving circuit 3 can include power converter 31, auxiliary circuit 34, and feedback control circuit 35. For example, power converter 31 may receive input voltage Vin1, and perform power conversion based on input voltage Vin1, in order to generate an output signal to drive load R to operate. Feedback circuit 35 can control the switching states of the power switch of power converter 31 according to feedback signal Vf of the output signal of power converter 31, in order to adjust the output signal of power converter 31. The output signal of power converter 31 can be a voltage signal, current signal I_L1, or a power signal. In addition, driving circuit 3 can also include power transmission network 32 and power transmission network 33. For example, power transmission network 32 can connect between power converter 31 and load R, and power transmission network 33 can connect between load R and auxiliary circuit 34. Power transmission network 32 and power transmission network 33 may both include different types of capacitors, and parasitic resistors and parasitic inductors in the power transmission path. In this example, the output signal of power converter 31 may drive load R after passing through power transmission network 32. Therefore, the variation of load electric signals, such as load current or load voltage, can represent the variation of the output signal of the power converter.

Auxiliary circuit 34 can start operating when the output signal of power converter 31 changes, in order to directly provide auxiliary current I_Au to the load to limit the variation range of the load voltage. Optionally, auxiliary circuit 34 can start operating when the variation of the output signal of power converter 31 is greater than a predetermined value, so as to provide auxiliary current I_Au to the load to limit the variation range of the load voltage, thereby avoiding the generation of the spike of the load voltage and maintaining the stability of the load voltage. Optionally, the variation of the output signal of power converter 31 may be an instantaneous variation, that is, a variation per unit time, or a variation within a predetermined time. The predetermined value can be set according to specific application scenarios. For example, the predetermined value can be determined according to the regulation capability of the power converter. In another example, the variation of the output signal of the power converter can be determined by collecting the variation of the load electrical signal. The load electrical signal can be the voltage across the load or the current flowing through the load. Optionally, the auxiliary current in this example can be determined according to the load voltage.

In another example, when the electrical signal of the load fluctuates, the response speed of auxiliary current I_Au is controlled to be faster than the response speed of the output signal (e.g., output current I_L1) of the power converter, in order to limit the fluctuation range of the load voltage through the auxiliary current and avoid the generation of the spike of the load voltage, thereby reducing the power loss and avoiding the damage of circuit elements. In another example, auxiliary circuit 34 can attenuate the output impedance of the power converter in a predetermined frequency range through auxiliary current I_Au, in order to limit the variation range of the load voltage. Optionally, auxiliary circuit 34 can attenuate the output impedance in the frequency range outside the adjustment range of the power converter through auxiliary current I_Au, thereby reducing the cost.

Optionally, auxiliary circuit 34 and feedback control circuit 35 are controlled independently, and there may be no connection or communication between them. As compared with auxiliary circuit 34 and power converter 31 sharing the same controller, there may be no need to coordinate the control of auxiliary circuit 34 and feedback control circuit 35 in this example, which significantly simplifies the system design. Also for example, feedback control circuit 35 may generate a control signal according to feedback signal Vf to control power converter 31. Auxiliary circuit 34 can generate auxiliary current I_Au according to feedback signal Vf. As shown in FIG. 3, feedback control circuit 35 and auxiliary circuit 34 may share feedback signal Vf. It should be understood that the sampling points of the load voltage shown in FIG. 3 are only exemplary, and other sampling points that can characterize the load voltage, such as the output terminals of the output port of power converter 31 or the output terminals of the output port of auxiliary circuit 34, can be applied to this embodiment. In other alternative implementations, feedback control circuit 35 and auxiliary circuit 34 can also adopt the load voltage fed back by different sampling points.

In particular embodiments, the auxiliary circuit may start operating when the variation of the output signal of the power converter is larger than the predetermined value, so as to provide auxiliary current to the load to limit the variation range of the load voltage, thereby avoiding the situation that the load voltage suddenly drops or rises to generate spikes, keeping the strict regulation of the load voltage, maintaining the stability of the load voltage, and improving the system efficiency.

In an alternative implementation, auxiliary circuit 34 can include a DC blocking capacitor, the variation range of the load voltage is limited by amplifying the capacitance value of the DC blocking capacitor. Therefore, in this example, a smaller DC blocking capacitor can be equivalent to a larger capacitor, such that the impedance of each frequency range can be attenuated without setting too many output filtering capacitors, and the auxiliary current can be provided to improve the dynamic response speed, so that the stability of the load voltage can be maintained.

In an alternative implementation, the auxiliary circuit may also include a voltage closed-loop regulating circuit, the auxiliary current is determined according to the error of the capacitor voltage sampling signal of the DC blocking capacitor and the reference signal. Optionally, the DC blocking capacitor can be coupled between the output terminal of the voltage closed-loop regulating circuit and the load. Optionally, the auxiliary circuit may also include a feedback circuit connected between the load and the output terminal of the voltage closed-loop regulating circuit to obtain the capacitor voltage sampling signal.

Figure 4:
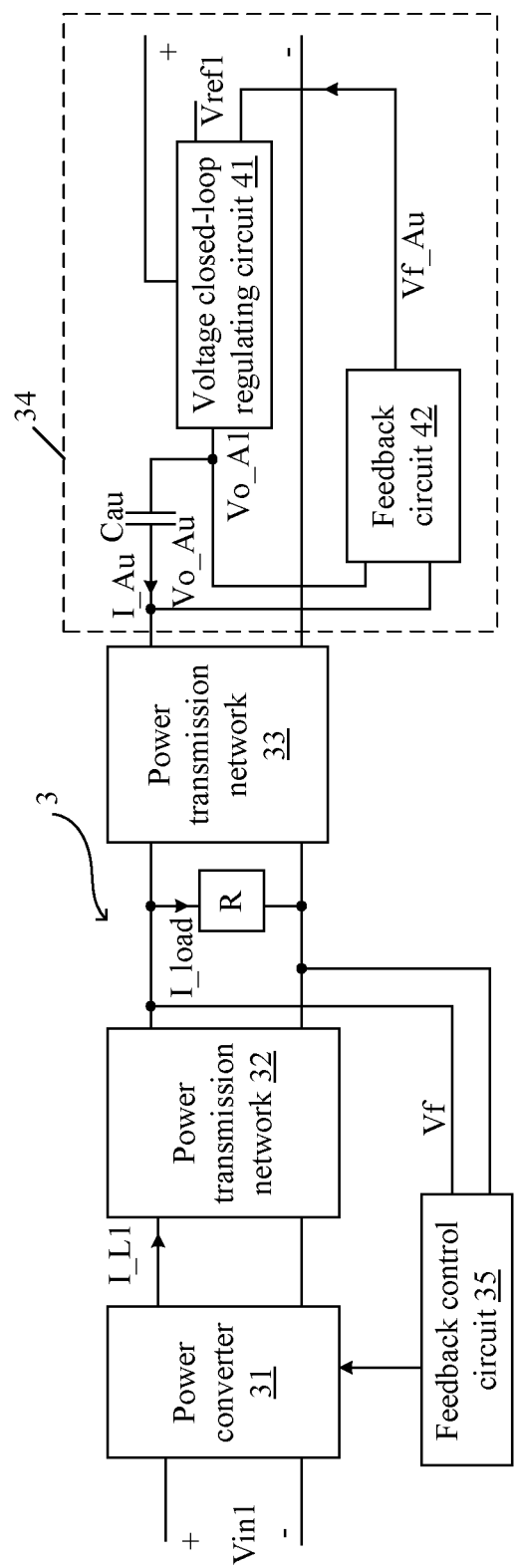
FIG. 4 is a schematic circuit diagram of a first example auxiliary circuit of a power converter, in accordance with embodiments of the preset invention.

Referring now to FIG. 4, shown is a schematic circuit diagram of a first example auxiliary circuit of a power converter, in accordance with embodiments of the preset invention. In this particular example, auxiliary circuit 34 can include DC blocking capacitor Cau, voltage closed-loop regulating circuit 41, and feedback circuit 42. DC blocking capacitor Cau can be coupled between load R and the output terminal of voltage closed-loop regulating circuit 41, and feedback circuit 42 may sample the voltage across DC blocking capacitor Cau to obtain capacitor voltage sampling signal Vf_Au. Optionally, feedback circuit 42 can determine the voltage across DC blocking capacitor Cau by sampling output voltage Vo_A1 of voltage closed-loop circuit 41 and output voltage Vo_Au of auxiliary circuit 34. As readily understood, output voltage Vo_Au of auxiliary circuit 34 is the input voltage of power transmission network 33, which can also be used to characterize the load voltage of load R.

Therefore, feedback circuit 42 may obtain capacitor voltage sampling signal Vf_Au of DC blocking capacitor Cau according to the load voltage of load R and output voltage Vo_A1 of voltage closed-loop regulating circuit 41. Voltage closed-loop regulating circuit 41 may determine auxiliary current I_Au according to the error between capacitor voltage sampling signal Vf Au of DC blocking capacitor Cau and reference signal Vrefl, in order to regulate the load voltage of load R through auxiliary current I_Au, thereby limiting the variation range of the load voltage and avoiding voltage spikes. As an optional example, voltage closed-loop regulating circuit 41 is a linear circuit or a switching circuit. In yet another example, voltage closed-loop regulating circuit 41 can be realized by a digital circuit or an analog circuit.

In another example, feedback circuit 42 can include a first resistor and a second resistor connected in series between the first output terminal of auxiliary circuit 34 and the output terminal of voltage closed-loop regulating circuit 41. The capacitance amplification coefficient of DC blocking capacitor Cau can be determined according to the ratio of the first resistor to the second resistor. Therefore, in this example, the ratio of the first resistor to the second resistor and/or the capacitance value of DC blocking capacitor Cau are set based on the specific application scenario of the power converter or the frequency adjustment range of the power converter, such that auxiliary circuit 34 outputs an appropriate auxiliary current I_Au to limit the variation range of the load voltage. In other alternative implementations, feedback circuit 42 may include a first capacitor and a second capacitor connected in series between the first output terminal of auxiliary circuit 34 and the output terminal of voltage closed-loop regulating circuit 41.

In particular embodiments, the capacitance amplification coefficient of the DC blocking capacitor can be set by the feedback circuit, and the auxiliary current can be determined according to the error of the capacitor voltage sampling signal of the DC blocking capacitor and the reference signal, and then the variation range of the load voltage can be limited by the auxiliary current. Therefore, in this example, the DC blocking capacitor with smaller capacitance value is equivalent to the capacitor with larger capacitance value, the impedance of each frequency range can be attenuated without setting too many output filtering capacitors, and the auxiliary current can be provided to improve the dynamic response speed, such that the stability of the load voltage can be maintained.

Figure 5:
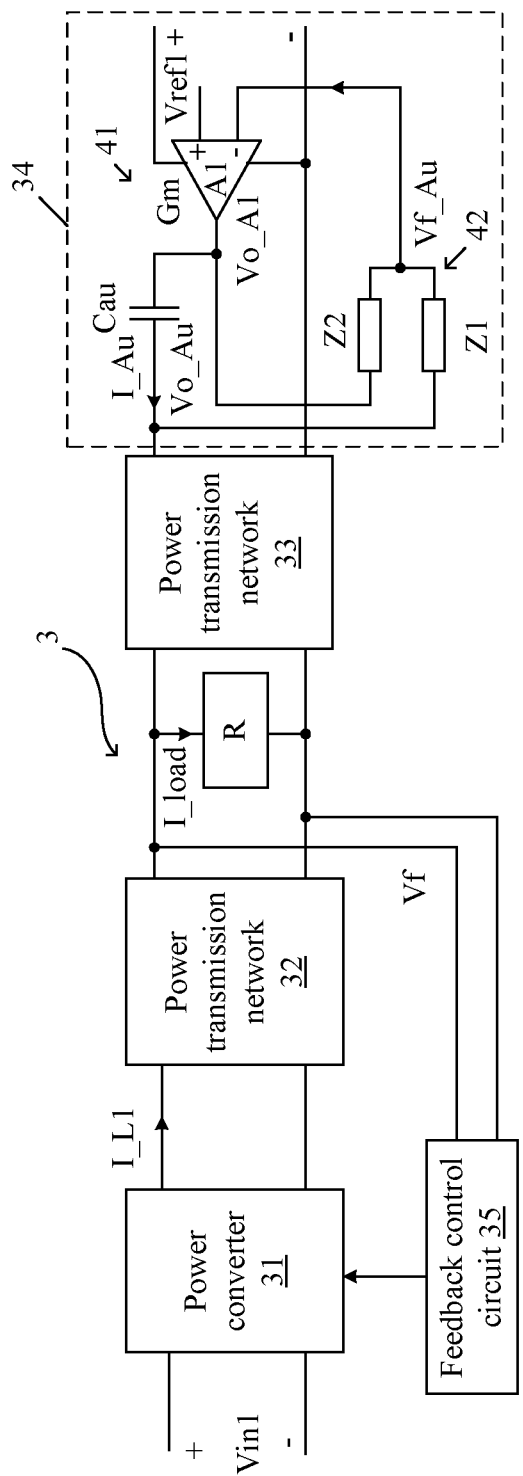
FIG. 5 is a schematic circuit diagram of a second example auxiliary circuit of a power converter, in accordance with embodiments of the preset invention.

Referring now to FIG. 5, shown is a schematic circuit diagram of a second example auxiliary circuit of a power converter, in accordance with embodiments of the preset invention. In particular embodiments, voltage closed-loop regulating circuit 41 in auxiliary circuit 34 can include amplifier A1. The gain of amplifier A1 is Gm, and input terminals of amplifier A1 may respectively receive capacitor voltage sampling signal Vf Au and reference signal Vrefl. Feedback circuit 42 in auxiliary circuit 34 can include resistors Z1 and Z2. Resistors Z1 and Z2 can connect in series between the first output terminal of auxiliary circuit 34 and the output terminal of amplifier A1. DC blocking capacitor Cau can connect between the first output terminal of auxiliary circuit 34 and the output terminal of amplifier A1. The common terminal of resistors Z1 and Z2 can connect to the inverting input terminal of amplifier A1.

In this example, based on auxiliary circuit 34 shown in FIG. 5, the following can be obtained:

$$Ko = Z2/(Z1+Z2) \quad (1)$$

Here, Ko represents the gain of feedback circuit 42.

$$Zo = Z\_Cau//(Z1+Z2) \quad (2)$$

$$(Z1+Z2) \gg Z\_Cau, Zo \approx Z\_Cau \quad (3)$$

Here, Zo represents open-loop output impedance, "//" represents the parallel impedance operator, Z_Cau represents the impedance of the branch where DC blocking capacitor Cau is located.

The open-loop output impedance Zo is equal to the parallel impedance of feedback circuit 42 and DC blocking capacitor Cau. In this embodiment, the impedance (Z1+Z2) of the branch where feedback circuit 42 is located is much larger than the impedance Z_Cau of the branch where DC blocking capacitor Cau is located, so open-loop output impedance Zo is approximately equal to impedance Z_Cau of the branch where DC blocking capacitor Cau is located.

$$G\_Loop = Gm*Ko*Zo \quad (4)$$

$$Vo\_A1 - Vo\_Au = Gm*(Vrefl - Vf\_Au)*Zo \quad (5)$$

$$Vf\_Au = Vo\_Au*(1-Ko) + Vo\_A1*Ko \quad (6)$$

Here, G_Loop represents the loop gain of auxiliary circuit 34, Vo_A1 represents the output voltage of amplifier A1, Vo_Au represents the output voltage of auxiliary circuit 34, Vrefl represents the reference signal, and Vf Au represents the capacitor voltage sampling signal. Based on the above formulas (1)-(6), it can be obtained:

$$Vo\_A1 = Vo\_Au*[Ko - G\_Loop/(1+G\_Loop)]/Ko + Vrefl*G\_Loop/(1+G\_Loop)/Ko \quad (7)$$

If the loop gain G_Loop≫1 and the gain Ko≪1, formula (7) can be simplified as:

$$Vo\_A1 \approx (Vrefl - Vo\_Au)/Ko \quad (8)$$

According to the formula (8), closed-loop output impedance Zoc of auxiliary circuit 34 can be obtained below:

$$Zoc \approx Zo*Ko = Z\_Cau*Ko \quad (9)$$

Therefore, auxiliary circuit 34 can be used as a capacitor amplifier with a gain of 1/Ko. For example, if the gain Ko of feedback circuit 42 is equal to 0.05 and the capacitance value of DC blocking capacitor Cau is equal to 1 uF, DC blocking capacitor Cau can be equivalent to 20 capacitors with a capacitance value of 1 uF connected in parallel in auxiliary circuit 34. Therefore, particular embodiments can provide the auxiliary current to improve the dynamic response speed and further maintain the stability of the load voltage under the condition of using fewer capacitor devices or a capacitor device with a low capacitance value.

In this example, the capacitance amplification coefficient of the DC blocking capacitor can be set by the feedback circuit, the error of the capacitor voltage sampling signal of the DC blocking capacitor and the reference signal can be obtained to determine the auxiliary current, and the variation range of the load voltage can be limited by the auxiliary current. In particular embodiments, a smaller DC blocking capacitor can be used to equivalent a larger capacitor, the impedance of each frequency range can be attenuated without setting too many output filtering capacitors, and the auxiliary current may be provided to improve the dynamic response speed, such that the stability of the load voltage can be maintained, the voltage spike can be avoided, and the system loss can be reduced.

Figure 6:
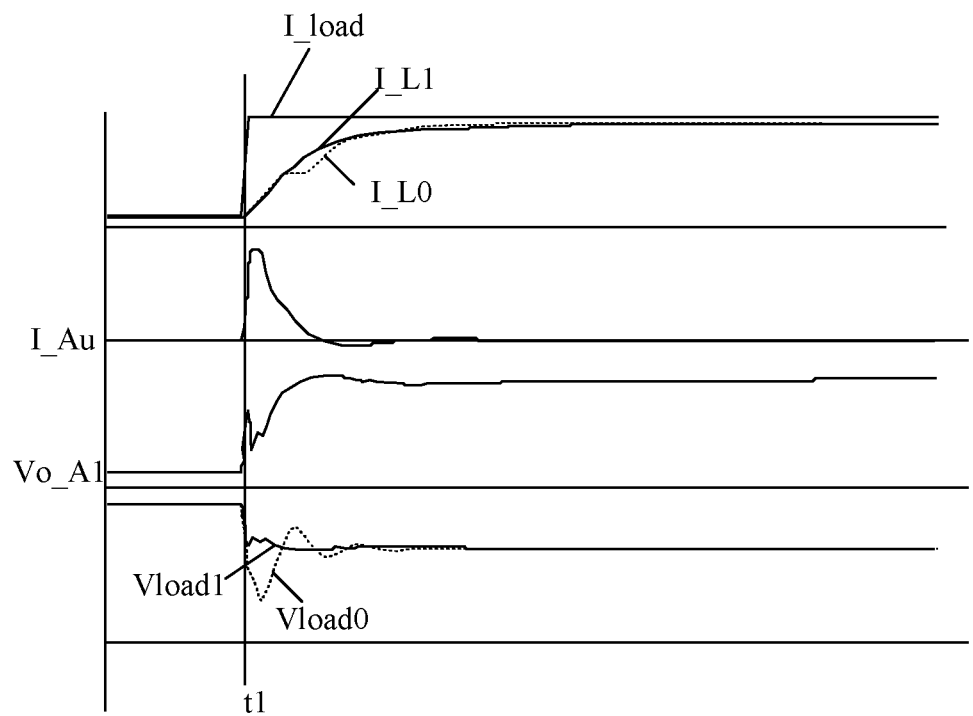
FIG. 6 is a waveform diagram of a first example operation of a driving circuit, in accordance with embodiments of the preset invention.

Referring now to FIG. 6, shown is a waveform diagram of a first example operation of a driving circuit, in accordance with embodiments of the preset invention. In this particular example, I_L0 represents the output current of the power converter when the auxiliary circuit in the first embodiment or the second embodiment is not used, I_L1 represents the output current of the power converter when the auxiliary circuit in the first embodiment or the second embodiment is used, I_load represents the load current when the auxiliary circuit in the first embodiment or the second embodiment is used, I_Au represents the auxiliary current output by the auxiliary circuit in the first embodiment or the second embodiment, Vo_A1 represents the output voltage of the amplifier of the auxiliary circuit in the first embodiment or the second embodiment, Vload0 represents the load voltage when the auxiliary circuit in the first embodiment or the second embodiment is not used, Vload 1 represents the load voltage when the auxiliary circuit in the first embodiment or the second embodiment is used.

After the auxiliary circuit shown in FIG. 4 (i.e., the first embodiment) or FIG. 5 (i.e., the second embodiment) is applied, at moment t1, load current I_load increases rapidly with the increase of output current I_L1 of power converter 31, and load voltage Vload1 of load R drops due to the influence of power transmission network 32. Auxiliary circuit 34 may obtain the capacitor voltage sampling signal of the DC blocking capacitor by sampling, in order to amplify the DC blocking capacitor in the auxiliary circuit based on output voltage Vo_A1 of the amplifier, and generate output auxiliary current I_Au with fast dynamic response speed, thus adjusting the load voltage, avoiding the voltage spike, and avoiding the system damage or unnecessary power loss. As shown in FIG. 6, compared with the condition without the auxiliary circuit, when the auxiliary circuit in the first embodiment or the second embodiment is used, output current I_L1 of the power converter is smoother, the adjustment speed of load voltage Vload1 is faster, and there will be no voltage spike.

In this embodiment, after load voltage Vload1 is stabilized, output voltage Vo_A1 of the amplifier remains stable, and the current flowing through the DC blocking capacitor, that is, auxiliary current I_Au, drops to 0. Therefore, in this example, when the output current (or load current) of the power converter changes too much, resulting in the sudden rise or fall of the load voltage, the auxiliary circuit is started, in order to avoid the voltage spike, thereby avoiding system damage or unnecessary power loss.

In an alternative implementation, auxiliary circuit 34 can include a voltage-controlled current source circuit to determine the auxiliary current according to the dynamic change information of the output signal of the power converter, so as to limit the variation range of the load voltage according to the auxiliary current, avoid voltage spikes and reduce the system loss. Optionally, in this embodiment, the voltage-controlled current source circuit may be a linear circuit or a switching circuit. Further, the voltage-controlled current source circuit can be realized by a digital amplifier circuit or an analog amplifier circuit, and this embodiment is not limited to this.

In an alternative implementation, auxiliary circuit 34 can also include a compensation circuit outputting a compensation signal to compensate the dynamic change information of the output signal of power converter 31, and then the voltage-controlled current source circuit may determine the auxiliary current according to the compensation signal. For example, the output port of the compensation circuit is connected to the input port of the voltage-controlled current source circuit. Optionally, the compensation circuit may perform zero-pole compensation on the dynamic change information of the output signal of power converter 31 to output the compensation signal.

Optionally, auxiliary circuit 34 can also include a high-pass filter. The high-pass filter can collect the dynamic change information of the output signal of power converter 31. Optionally, the high-pass filter can include a first capacitor and a third resistor connected in series between the output terminals of the output port of power converter 31. Optionally, the input terminals of the compensation circuit are respectively connected to the first output terminal of power converter 31 and the common terminal of the first capacitor and the third resistor, respectively, to compensate the dynamic change information collected by the high-pass filter.

Figure 7:
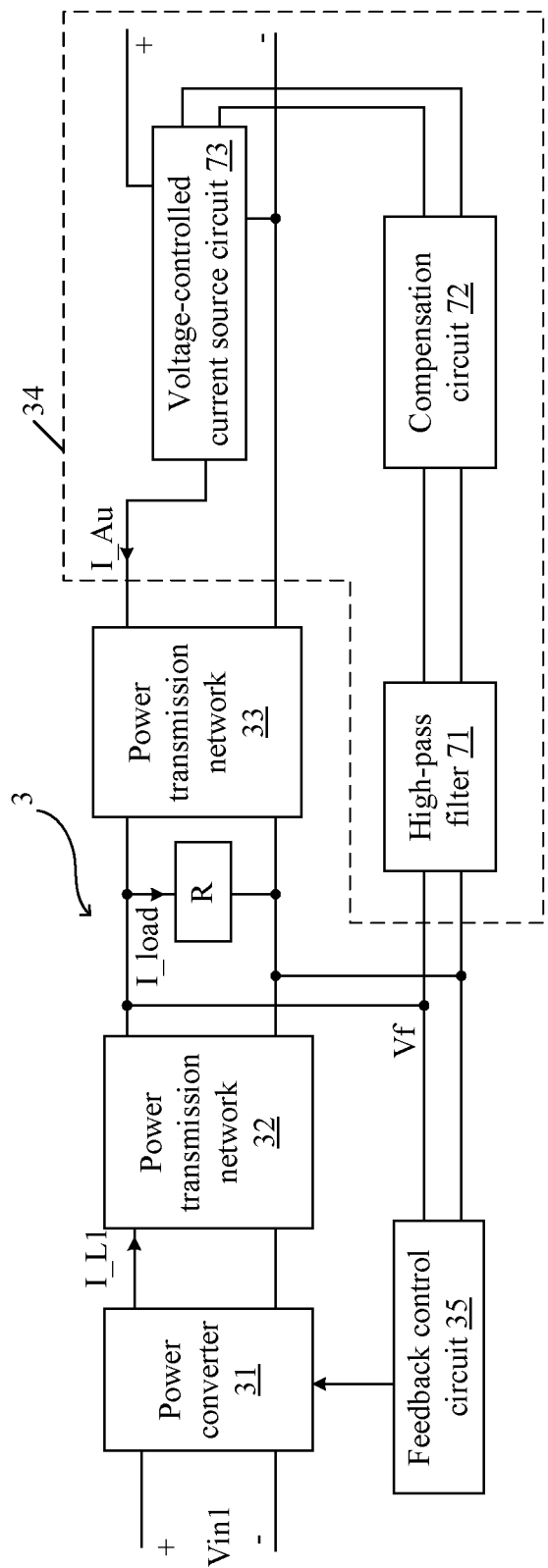
FIG. 7 is a schematic circuit diagram of a third example auxiliary circuit of a power converter, in accordance with embodiments of the preset invention.

Referring now to FIG. 7, shown is a schematic circuit diagram of a third example auxiliary circuit of a power converter, in accordance with embodiments of the preset invention. In this particular example, auxiliary circuit 34 can include high-pass filter 71, compensation circuit 72, and voltage-controlled current source circuit 73. High-pass filter 71 can connect to the output port of power converter 31 to collect the dynamic change information of the output signal of the power converter 31. Compensation circuit 72 may compensate the dynamic change information of the output signal of the power converter 31, in order to generates a compensation signal which is input to voltage-controlled current source circuit 73. Voltage-controlled current source circuit 73 may generate auxiliary current I_Au corresponding to the dynamic change information of the output signal of power converter 31 based on the compensation signal, in order to adjust the load voltage of load R, limit the variation range of the load voltage, avoid voltage spikes, and reduce the system loss.

Optionally, in this embodiment, high-pass filter 71 can collect the dynamic change information of the output signal of power converter 31, such that the output signal of power converter 31 with a variation greater than a predetermined value can pass through high-pass filter 71. The output signal of high-pass filter 71 can be input into compensation circuit 72 for zero-pole compensation to obtain the compensation signal. Voltage-controlled current source circuit 73 may generate auxiliary current I_Au according to the compensation signal, so as to limit the variation range of load voltage by supplying auxiliary current I_Au to load R. Further, in this embodiment, the parameters of high-pass filter 71 can be set, so that high-pass filter 71 allows signals beyond the adjustment range of power converter 31 to pass through, such that the impedance at each frequency can be attenuated based on the common adjustment of power converter 31 and auxiliary circuit 34, thereby improving the dynamic adjustment speed of the system.

In this embodiment, the dynamic change information of the output signal of power converter 31 can be collected by the high-pass filter in the auxiliary circuit, and then the compensation circuit can compensate the output signal of the high-pass filter to attenuate the impedance in the effective frequency range (e.g., frequency between the inflection point frequency of the high-pass filter and the control bandwidth of the auxiliary circuit). Therefore, in this embodiment, the impedance in each frequency range can be attenuated without setting too many output filter capacitors, thus improving the transient performance of the load, and maintaining the stability of the load voltage. When the signal with a frequency greater than a first frequency passes through the high-pass filter, it will no longer be attenuated, the first frequency is the inflection point frequency of the high-pass filter.

Figure 8:
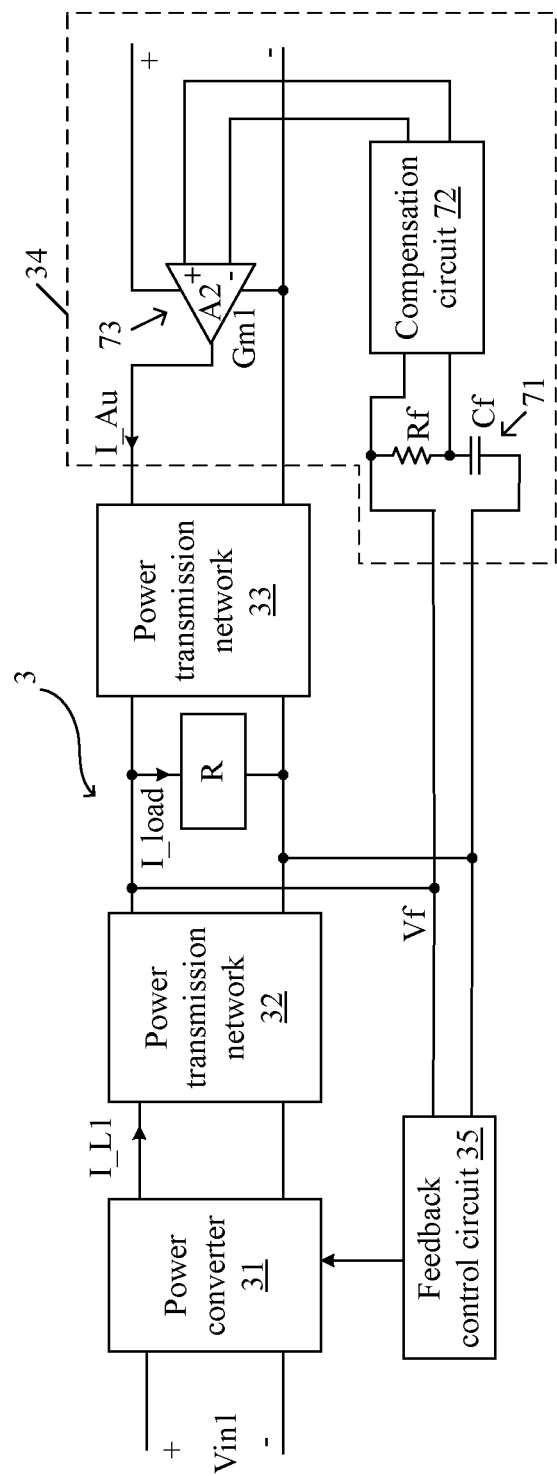
FIG. 8 is a schematic circuit diagram of a fourth example auxiliary circuit of a power converter, in accordance with embodiments of the preset invention.

Referring now to FIG. 8 is a schematic circuit diagram of a fourth example auxiliary circuit of a power converter, in accordance with embodiments of the preset invention. In this particular example, auxiliary circuit 34 can include high-pass filter 71, compensation circuit 72, and voltage-controlled current source circuit 73. High-pass filter 71 can include resistor Rf and capacitor Cf. Resistor Rf and capacitor Cf can connect in series between the output terminals of the output port of power converter 31. Optionally, one terminal of resistor Rf can connect to the first output terminal (i.e., the positive output terminal) of power converter 31, one terminal of capacitor Cf is connected to the second output terminal (i.e., the negative output terminal) of power converter 31, the common terminal of resistor Rf and capacitor Cf can connect to one input terminal of compensation circuit 72, and the other input terminal of compensation circuit 72 can connect to the first output terminal of power converter 31. Voltage-controlled current source circuit 73 may be realized by amplifier A2, whereby gain of amplifier A2 is Gm1. The output terminals of compensation circuit 72 can connect to the non-inverting input terminal and inverting input terminal of amplifier A2, respectively.

In an alternative implementation, compensation circuit 72 can adjust the zeros and poles of the system to make the system more stable. Further, compensation circuit 72 may only adjust the zeros and poles of the system in the effective frequency range, and this embodiment is not limited to this. Optionally, compensation circuit 72 can be any existing configuration circuit with zeros and poles, which can be set according to the system requirements. Specifically, in this embodiment, based on auxiliary circuit 8 shown in FIG. 8, the following can be obtained:

$$F\_HP(s)=s*Cf*Rf/(1+s*Cf*Rf) \quad (10)$$

Here, F_HP(s) represents the transfer function of high-pass filter 71 formed by capacitor Cf and resistor Rf. When the frequency $1/(2*\pi*Cf*Rf)$ is much higher than the inflection point frequency of high-pass filter 71, F_HP(s)≅1;

$$G\_Loop(s)=F\_HP(s)*F\_comp(s)*Gm1*Zo2 \quad (11)$$

$$Zo2c=Zo2/(1+G\_Loop(s)) \quad (12)$$

Here, G_Loop represents the loop gain of auxiliary circuit 34, F_comp(s) represents the function of compensation circuit 72, Gm1 represents the gain of amplifier A2, Zo2c represents the closed-loop output impedance of auxiliary circuit 34, and Zo2 represents the equivalent impedance of the output terminal of amplifier A2. It can be seen that when there is enough loop gain G_Loop(s), closed-loop output impedance Zo2c will obviously attenuate in the effective frequency range, which improves the transient performance of the load and reduces the number of output filter capacitors.

In this embodiment, high-pass filter 71 can collect the dynamic change information of the output signal of power converter 31, and input the dynamic change information into compensation circuit 72 for zero-pole compensation to obtain the compensation signal. Voltage-controlled current source circuit 73 may generate auxiliary current I_Au according to the compensation signal, in order to limit the variation range of the load voltage by supplying auxiliary current I_Au to load R. In this embodiment, the dynamic change information of the output signal of power converter 31 can be collected by the high-pass filter in the auxiliary circuit, so as to attenuate the impedance in the effective frequency range. Therefore, the impedance in each frequency range can be attenuated without setting too many output filter capacitors, thus improving the transient performance of the load and maintaining the stability of the load voltage. In addition, because the load voltage can be adjusted in time without voltage spikes, the voltage feedback signal is relatively stable, which can further stabilize the output signal of the power converter and reduce the loss.

Figure 9:
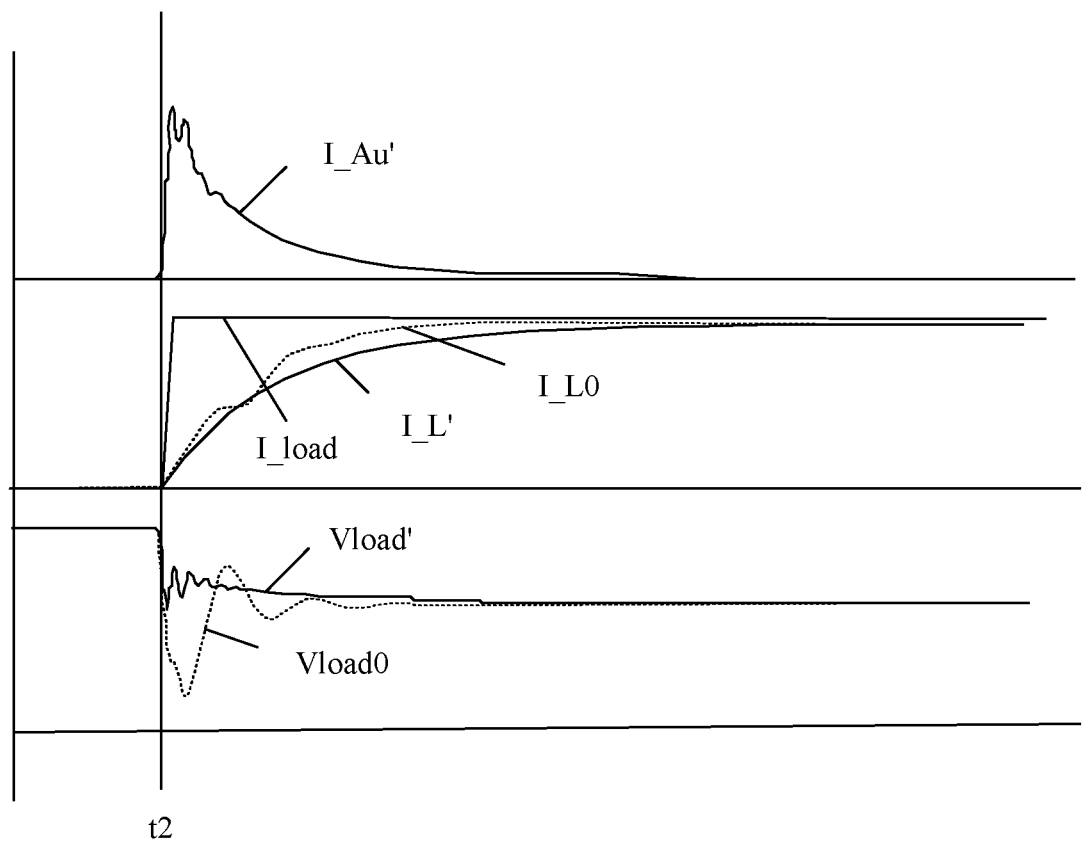
FIG. 9 is a waveform diagram of a second example operation of a driving circuit, in accordance with embodiments of the preset invention.

Referring now to FIG. 9, shown is a waveform diagram of a second example operation of a driving circuit, in accordance with embodiments of the preset invention. In this particular example, I_L0 represents the output current of the power converter when the auxiliary circuit in the third embodiment or the fourth embodiment is not used, I_L' represents the output current of the power converter when the auxiliary circuit in the third embodiment or the fourth embodiment is used, I_load represents the load current when the auxiliary circuit in the third embodiment or the fourth embodiment is used, I_Au' represents the auxiliary current output by the auxiliary circuit in the third embodiment or the fourth embodiment, Vload0 represents the load voltage when the auxiliary circuit in the third embodiment or the fourth embodiment is not used, Vload' represents the load voltage when the auxiliary circuit in the third embodiment or the fourth embodiment is used.

After the auxiliary circuit shown in FIG. 7 (i.e., the third embodiment) or FIG. 8 (i.e., the fourth embodiment) is applied, at moment t2, load current I_load increases rapidly with the increase of output current I_L' of power converter 31, and the load voltage Vload' may drop due to the influence of power transmission network 32. High-pass filter 71 in auxiliary circuit 34 can collect the dynamic change information of the output signal of power converter 31, and input the dynamic change information into compensation circuit 72 for zero-pole compensation, in order to generate the compensation signal. Voltage-controlled current source circuit 73 may generate auxiliary current I_Au' according to the compensation signal, in order to limit the variation range of load voltage by supplying auxiliary current I_Au' to load R, realize the adjustment of the load voltage and avoid the voltage spike, thus avoiding the system damage or unnecessary power loss. As shown in FIG. 9, as compared with the condition without the auxiliary circuit, when the auxiliary circuit in the third embodiment or the fourth embodiment is used, the output current I_L' of the power converter is smoother, the adjustment speed of load voltage Vload' is faster, and there may be no voltage spike.

In this embodiment, after the load voltage Vload' stabilizes, auxiliary current I_Au' drops to 0, and the auxiliary circuit may stop operating. Therefore, in this embodiment, when the output current (or load current) of the power converter changes too much, resulting in the sudden rise or fall of the load voltage, the auxiliary circuit can be started, in order to avoid the voltage spike, thereby avoiding system damage or unnecessary power loss. In this embodiment, auxiliary circuit 34 with faster response speed compared with the power converter 31 can be adopted to start adjusting the load voltage when the change rate of the load electrical signal is too fast, thus avoiding device damage or unnecessary power loss caused by voltage spikes. In an alternative implementation, the voltage-controlled current source circuit in FIG. 7 and FIG. 8 can be a linear amplifier circuit, a switching conversion amplifier circuit, or a digital control amplifier circuit, to name just a few examples.

Figure 10:
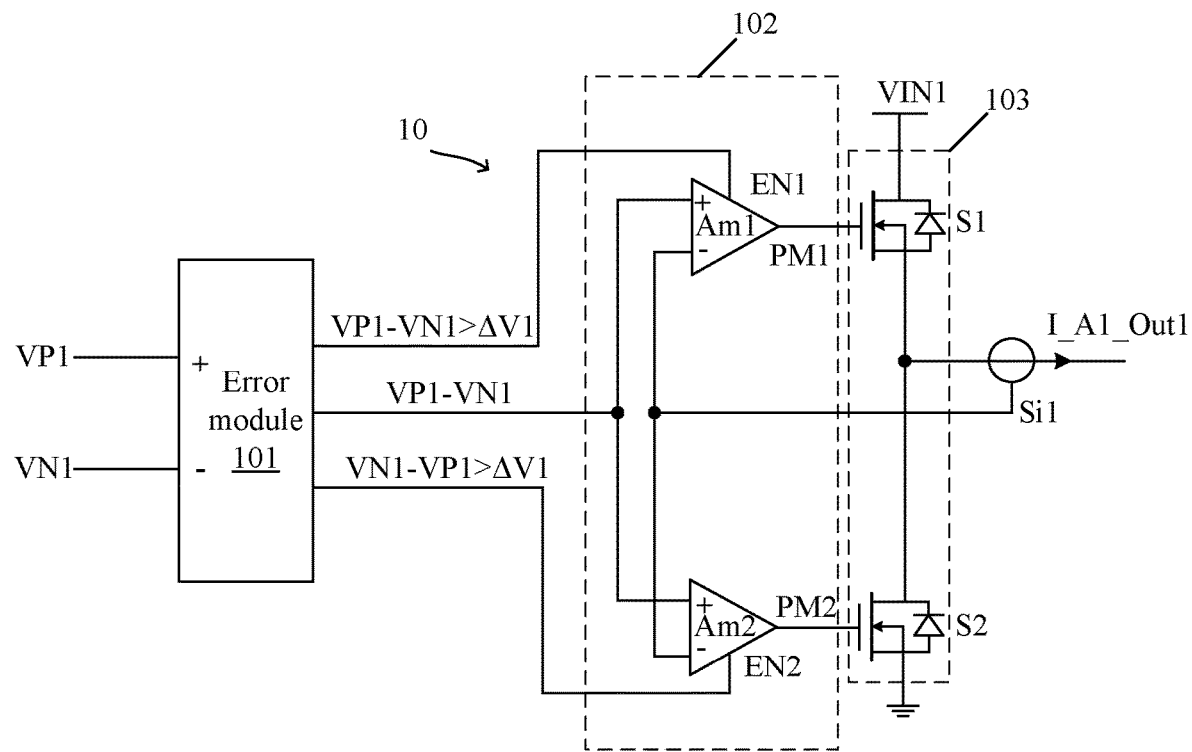
FIG. 10 is a schematic circuit diagram of a first example voltage-controlled current source circuit, in accordance with embodiments of the preset invention.

Referring now to FIG. 10, shown is a schematic circuit diagram of a first example voltage-controlled current source circuit, in accordance with embodiments of the preset invention. In this particular example, voltage-controlled current source circuit 10 is a linear amplifier circuit. The voltage-controlled current source circuit 10 can include error module 101, linear amplification module 102, switch module 103, and pull-up power supply VIN1. Pull-up power supply VIN1 can supply voltage according to the switching state of switch module 103.

Error module 101 can generate error signal (e.g., VP1-VN1) between the input voltages VP1 and VN1 at the input terminals of error module 101, and determine whether the error signal (e.g., VP1-VN1) meets the predetermined condition. When the error signal (e.g., VP1-VN1) meets the predetermined condition, voltage-controlled current source circuit 10 can be enabled by a control voltage; otherwise, voltage-controlled current source circuit 10 is controlled to be disabled by an inhibit voltage. Optionally, in this embodiment, the error signal (e.g., VP1-VN1) meets the predetermined condition; that is, the error signal (e.g., VP1-VN1) is not in the dead zone (e.g., −ΔV1-+AV1), and in other words, the absolute value of the error signal (e.g., VP1-VN1) is greater than AV1. In this embodiment, the value of AV1 may be determined according to specific application scenarios. For example, in auxiliary circuit 34, the error signal is the compensation signal output by the compensation circuit, and the value of ΔV1 may be determined according to the variation of the output signal of the power converter that needs to be adjusted by the auxiliary circuit, in order to ensure that the auxiliary circuit only operates when the transient of load voltage is large enough, thus saving the power consumption of the auxiliary circuit.

Linear amplification module 102 can generate switching control signals according to the error signal and sampling signal Si1 of output current I_A1_Out1, when the error signal satisfies the predetermined condition. In an alternative implementation, linear amplification module 102 can include error amplifiers Am1 and Am2. The output terminal of error amplifier Am1 can connect to the control terminal of switch S1. Error amplifier Am1 can generate switch control signal PM1 of switch S1 according to the error signal (e.g., VP1-VN1) and sampling signal Si1 of output current I_A1_Out1, in order to adjust the on-resistance of switch S1 by adjusting the gate voltage of switch 51 through switch control signal PM1, thereby controlling output current I_A1_Out1 generated by voltage-controlled current source circuit 10. The output terminal of error amplifier Am2 can connect to the control terminal of switch S2. Error amplifier Am2 can generate switch control signal PM2 of switch S2 according to the error signal (i.e., VP1-VN1) and sampling signal Si1 of output current I_A1_Out1, so as to adjust the on-resistance of switch S2 by adjusting the gate voltage of switch S2 through switch control signal PM2, thereby controlling output current I_A1_Out1 generated by voltage-controlled current source circuit 10. When switch S1 is controlled to turn on, output current I_A1_Out1 can be greater than 0; that is, in the current outflow state. When switch S2 is controlled to turn on, output current I_A1_Out1 may be less than 0; that is, in the current inflow state.

Switch module 103 can control the switching state according to the switch control signals output by linear amplification module 102. In an alternative implementation, switch module 103 can include switches S1 and S2. Switches S1 and S2 can connect in series between pull-up power supply VIN1 and the ground terminal, and the common terminal of switches S1 and S2 can connect to the output terminal of the voltage-controlled current source circuit. For example, switches S1 and S2 are metal oxide semiconductor field-effect transistors (MOSFET). However, other types of electrically controlled switching device, such as bipolar transistor (BJT) and insulated gate transistor (IGBT), can also be used as the switch in certain embodiments.

As shown in FIG. 10, in this embodiment, the operating states of error amplifiers AM1 and AM2 may be controlled through control terminal EN1 of error amplifier AM1 and the control terminal EN2 of error amplifier AM2, respectively, according to the error signal. When the error signal (e.g., VP1-VN1) meets the predetermined condition, error amplifiers AM1 and AM2 can be controlled to operate. For example, error amplifiers AM1 and AM2 generate switch control signals PM1 and PM2 respectively according to error signal (e.g., VP1-VN1) and sampling signal Si1 of output current I_A1_Out1, in order to adjust output current I_A1_Out1 of the voltage-controlled current source circuit by adjusting the gate voltages of switches S1 and S2. When error signal (e.g., VP1-VN1) does not meet the predetermined condition, error amplifiers AM1 and AM2 may be disabled, such that voltage-controlled current source circuit 10 does not operate.

Therefore, voltage-controlled current source circuit 10 shown in FIG. 10 can be applied to the auxiliary circuit 34 of the third or fourth embodiment. When the compensation signal output by the compensation circuit meets the predetermined condition; that is, when the variation of the output signal of the power converter is greater than the predetermined value, voltage-controlled current source circuit 10 can be controlled to operate by the control voltage, the auxiliary circuit is controlled to generate the auxiliary current to adjust the load voltage, such that the stability of the load voltage can be improved when the load electric signal changes too fast. Further, when the variation of the output signal of the power converter is less than or equal to the predetermined value, the load electric signal may change smoothly, and the inhibit voltage can control voltage-controlled current source circuit 10 to stop operating; that is, there is no need to start the auxiliary circuit at this time.

Figure 11:
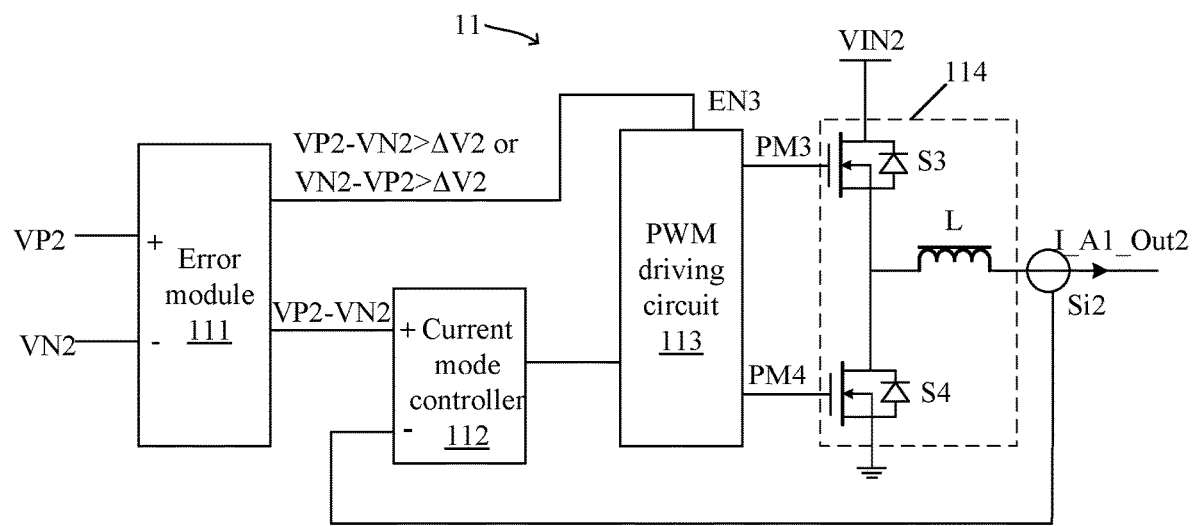
FIG. 11 is a schematic circuit diagram of a second example voltage-controlled current source circuit, in accordance with embodiments of the preset invention.

Referring now to FIG. 11, shown is a schematic circuit diagram of a second example voltage-controlled current source circuit, in accordance with embodiments of the preset invention. In this particular example, voltage-controlled current source circuit 11 is a switching conversion amplifier circuit. Voltage-controlled current source circuit 11 can include error module 111, current mode controller 112, PWM driving circuit 113, switching converter 114, and pull-up power supply VIN2. Error module 111, current mode controller 112, and PWM driving circuit 113 can generate control signals of switching converter 114, and pull-up power supply VIN2 can supply the input voltage of switching converter 114.

Error module 111 can generate error signal (e.g., VP2-VN2) between input voltages VP2 and VN2 at the input terminals of error module 111, and may determine whether the error signal (e.g., VP2-VN2) meets the predetermined condition. When the error signal (e.g., VP2-VN2) meets the predetermined condition, the voltage-controlled current source circuit 11 is controlled to be enabled by a control voltage, otherwise, voltage-controlled current source circuit 11 is controlled to be disabled by an inhibit voltage. Optionally, in this embodiment, the error signal (e.g., VP2-VN2) satisfies the predetermined condition, that is, the error signal (e.g., VP2-VN2) is not in the dead zone (e.g., $-\Delta V2$-+$\Delta V2$), that is, the absolute value of the error signal (e.g., VP2-VN2) is greater than $\Delta V2$. In this embodiment, the value of $\Delta V2$ is determined according to specific application scenarios. For example, in auxiliary circuit 34, the error signal, that is, the compensation signal output by the compensation circuit, represents the dynamic change information of the output signal of the power converter. Therefore, the value of $\Delta V2$ can be determined according to the variation of the output signal of the power converter that needs to be adjusted by the auxiliary circuit, such that the auxiliary circuit can be started when the variation of the output signal of the power converter is large enough to require the adjustment of the auxiliary circuit, thus saving power consumption.

Switching converter 114 can include switch S3, switch S4, and inductor L. Switches S3 and S4 can connect in series between pull-up power supply VIN2 and the ground terminal, and inductor L can connect between the common terminal of switch S3 and switch S4 and the output terminal of voltage-controlled current source circuit 11. It should be understood that switching converter 114 can be any one of boost topology, buck topology, buck-boost topology, Zeta topology, Sepic topology, Cuk topology, flyback converter, forward converter, push-pull converter, half-bridge converter, full-bridge converter, and LLC converter. For example, switches S3 and S4 may adopt metal oxide semiconductor field-effect transistors (MOSFET). However, other types of electrically controlled switching devices, such as bipolar transistor (BJT) and insulated gate transistor (IGBT), can also be used as switches in certain embodiments.

Current mode controller 112 can generate a first signal to control PWM driving circuit 113 to generate the control signals of switching converter 114 according to the error between the error signal (e.g., VP2-VN2) and sampling signal Si2 of output current I_A1_Out2. In this embodiment, the operating state of PWM driving circuit 113 can be controlled through control terminal EN3 of PWM driving circuit 113 according to the error signal (e.g., VP2-VN2) (that is, whether the error signal meets the predetermined condition). For example, PWM driving circuit 113 can be controlled to operate in response to the error signal satisfying the predetermined condition, and PWM driving circuit 113 can be controlled to prohibit operating in response to the error signal not satisfying the predetermined condition.

PWM driving circuit 113 can generate control signals PM3 and PM4 of switching converter 114 according to the output signal of current mode controller 112 (i.e., a first signal) to control the switching states of switches S3 and S4. Further, output current I_A1_Out2 of voltage-controlled current source circuit 11 can be adjusted by controlling the duty ratio of switches S3 and S4. The duty ratio of switches S3 and S4 in switching converter 114 may be determined according to the output signal of current mode controller 112.

Therefore, voltage-controlled current source circuit 11 shown in FIG. 11 is applied to auxiliary circuit 34 of the third or fourth embodiment. When the error signal output by the compensation circuit meets the predetermined condition, that is, when the variation of the output signal of the power converter is greater than the predetermined value, voltage-controlled current source circuit 11 can be controlled to operate by the control voltage, and the auxiliary circuit can generate the auxiliary current to adjust the load voltage, such that the stability of the load voltage can be improved when the load electric signal changes too fast. Furthermore, when the variation of the output signal of the power converter is less than or equal to the predetermined value, and the load electric signal changes smoothly, the inhibit voltage can control voltage-controlled current source circuit 11 to stop operating; that is, it may be unnecessary to start the auxiliary circuit at this time.

Figure 12:
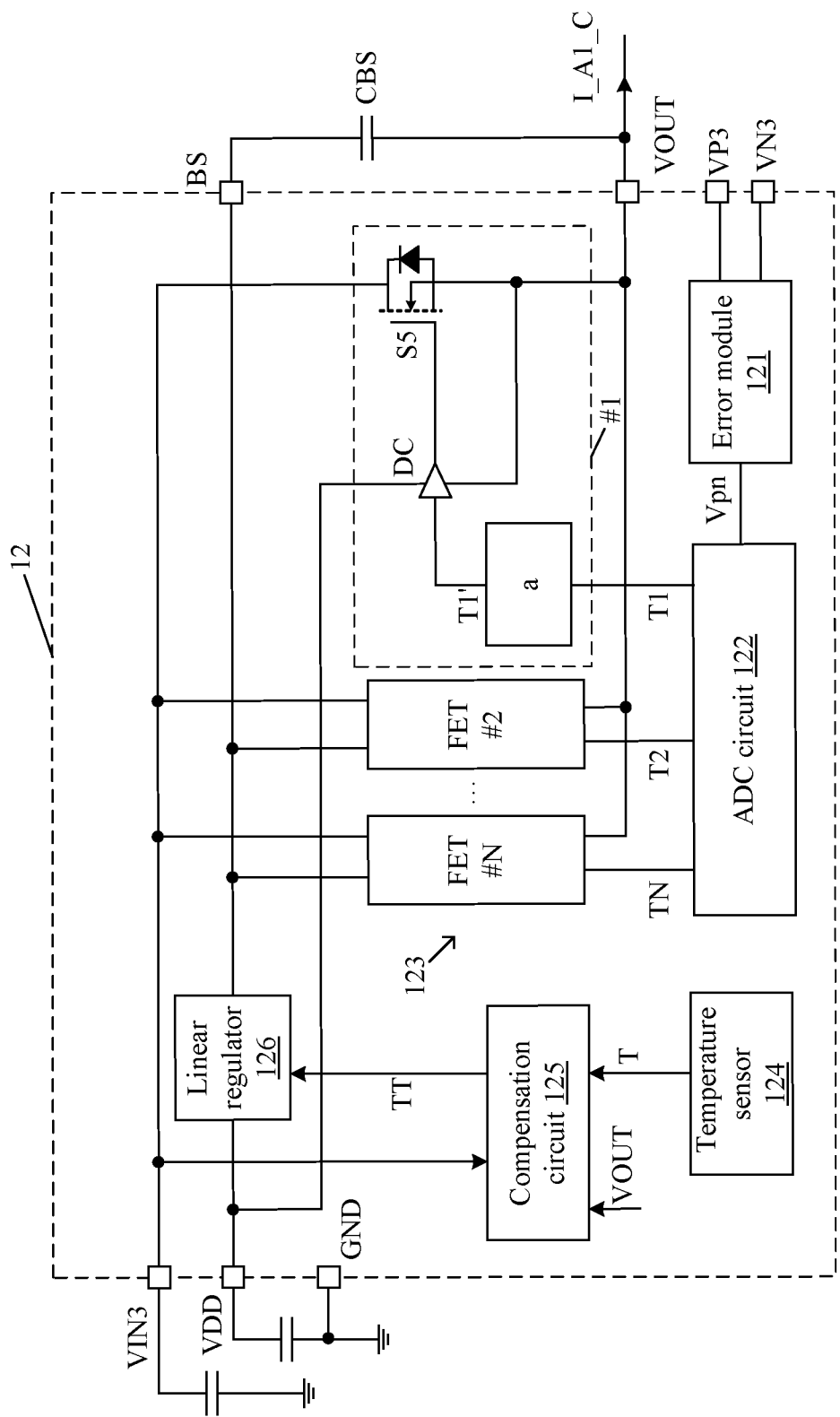
FIG. 12 is a schematic circuit diagram of a third example voltage-controlled current source circuit, in accordance with embodiments of the preset invention.

Referring now to FIG. 12, shown is a schematic circuit diagram of a third example voltage-controlled current source circuit, in accordance with embodiments of the preset invention. In this particular example, voltage-controlled current source circuit 12 is a digital control amplifier circuit. Voltage-controlled current source circuit 12 can include error module 121, ADC circuit 122, and switch unit 123. Optionally, voltage-controlled current source circuit 12 can also include output capacitor CBS connected in parallel with switch unit 123. Output capacitor CBS can improve the stability of output current I_A1_C and output voltage VOUT.

Error module 121 can calculate the difference (e.g., VP3-VN3) between the input voltages VP3 and VN3 of error module 121 to generate error signal Vpn, and may determine whether error signal Vpn meets the predetermined condition. When error signal Vpn meets the predetermined condition, voltage-controlled current source circuit 12 can be enabled by a control voltage; otherwise, voltage-controlled current source circuit 12 can be disabled by an inhibit voltage. Optionally, in this embodiment, error signal Vpn may satisfy the predetermined condition, that is, error signal Vpn is not in the dead zone (e.g., $-\Delta V3$-+$\Delta V3$); that is, the absolute value of the error signal Vpn is greater than $\Delta V3$. In this embodiment, the value of $\Delta V3$ is determined according to specific application scenarios. For example, in the auxiliary circuit 34, the error signal is the compensation signal output by the compensation circuit, and the value of $\Delta V3$ can be determined according to the variation of the output signal of the power converter that needs to be adjusted by the auxiliary circuit, such that the auxiliary circuit can be started when the variation of the output signal of the power converter is large enough to require the adjustment of the auxiliary circuit, thus saving power consumption. In an alternative implementation, ADC circuit 122 is a fast ADC circuit that can convert error signal Vpn into digital control signals to control the switching states of switch unit 123, thereby controlling output current I_A1_C.

Switch unit 123 may be controlled by voltage VDD and the digital control signals output by ADC circuit 122 to switch the switching states. In an alternative implementation, switch unit 123 can include N field-effect transistor modules FET #1-FET #N connected in parallel, where N is an integer greater than or equal to 1. ADC circuit 122 may output N digital control signals T1-TN to control field-effect transistor modules FET #1-FET #N, respectively. Optionally, take field-effect transistor module FET #1 as an example, field-effect transistor module FET #1 can include level conversion unit a, driver DC, and switch transistor S5. Level conversion unit a can shift the level of digital control signal T1 output by ADC circuit 122 to generate switching control signal T1' required by field-effect transistor module FET #1, in order to control the switching states of switch transistor S5 through driver DC. It should be understood that the control principle of other field-effect transistor modules is similar to that of field-effect transistor module FET #1, and as such will not be repeated here.

In an alternative implementation, voltage-controlled current source circuit 12 further can include temperature sensor 124, compensation circuit 125 and linear regulator 126. Temperature sensor 124 can detect the ambient temperature in real time. Compensation circuit 125 can generate compensation signal TT according to input voltage VIN3 of compensation circuit 125, output voltage VOUT and the ambient temperature to compensate the changes of input voltage VIN3, and output voltage VOUT and the ambient temperature. Linear regulator 126 can perform voltage stabilizing operation according to compensation signal TT. Therefore, in this embodiment, the required current can be provided to at least part of the field-effect transistor modules in switch unit 123 at any input voltage VIN3, output voltage VOUT and the ambient temperature, which improves the practical range of the circuit.

It should be understood that the voltage-controlled current source circuits shown in FIGS. 10-12 are only exemplary, and other types of linear amplifier circuits, switching conversion amplifier circuits, and digital control amplifier circuits can be applied to the third or fourth embodiment, and the invention is not limited to this. In particular embodiments, the auxiliary circuit is started when the variation of the output signal of the power converter is larger than the predetermined value, in order to provide auxiliary current to the load to limit the variation range of the load voltage, thereby avoiding the situation that the load voltage suddenly drops or rises to generate spikes, maintaining strict regulation of the load voltage, maintaining the stability of the load voltage, and improving the system efficiency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An auxiliary circuit of a power converter, wherein:
   a) the auxiliary circuit is coupled to a load of the power converter; and
   b) the auxiliary circuit is configured to generate an auxiliary current provided to the load, in order to limit a variation range of a load voltage of the load when a variation of an output signal of the power converter is greater than a predetermined value.

2. The auxiliary circuit of claim 1, wherein a response speed of the auxiliary current is faster than a response speed of the output signal of the power converter.

3. The auxiliary circuit of claim 1, wherein the auxiliary circuit is configured to attenuate an output impedance of the power converter in a predetermined frequency range through the auxiliary current, in order to limit the variation range of the load voltage.

4. The auxiliary circuit of claim 1, wherein the auxiliary circuit is configured to generate the auxiliary current according to the load voltage.

5. The auxiliary circuit of claim 1, wherein:
   a) the auxiliary circuit comprises a DC blocking capacitor; and
   b) the auxiliary circuit is configured to amplify a capacitance value of the DC blocking capacitor to limit the variation range of the load voltage.

6. The auxiliary circuit of claim 5, wherein the auxiliary circuit comprises:
   a) a voltage closed-loop regulating circuit configured to generate the auxiliary current according to an error of a capacitor voltage sampling signal of the DC blocking capacitor and a reference signal; and
   b) wherein the DC blocking capacitor is coupled between an output terminal of the voltage closed-loop regulating circuit and the load.

7. The auxiliary circuit of claim 6, wherein the auxiliary circuit comprises:
   a) a feedback circuit coupled between an output terminal of an output port of the auxiliary circuit and the output terminal of the voltage closed-loop regulating circuit, and configured to acquire the capacitor voltage sampling signal; and
   b) wherein the feedback circuit is configured to acquire the voltage sampling signal according to the load voltage and an output voltage of the voltage closed-loop regulating circuit.

8. The auxiliary circuit of claim 7, wherein the feedback circuit comprises:
   a) a first resistor and a second resistor connected in series; and
   b) wherein a capacitance amplification coefficient of the DC blocking capacitor is determined according to a ratio of the first resistor to the second resistor.

9. The auxiliary circuit of claim 6, wherein the voltage closed-loop regulating circuit is configured as one of a linear circuit and a switching circuit, or one of a digital circuit or an analog circuit.

10. The auxiliary circuit of claim 1, wherein the auxiliary circuit comprises a voltage-controlled current source circuit, configured to generate the auxiliary current according to a dynamic change information of the output signal of the power converter.

11. The auxiliary circuit of claim 10, wherein the auxiliary circuit comprises:
   a) a compensation circuit having two output terminals connected to two input terminals of the voltage-controlled current source circuit, and being configured to compensate the dynamic change information to generate a compensation signal; and
   b) wherein the voltage-controlled current source circuit is configured to generate the auxiliary current according to the compensation signal.

12. The auxiliary circuit of claim 11, wherein the compensation circuit is configured to perform a zero-pole compensation on the dynamic change information to generate the compensation signal.

13. The auxiliary circuit of claim 10, wherein the auxiliary circuit further comprises a high-pass filter, configured to collect the dynamic change information.

14. The auxiliary circuit of claim 13, wherein high-pass filter comprises:
   a) a first capacitor and a third resistor, connected in series between output terminals of an output port of the power converter; and
   b) wherein input terminals of the compensation circuit is respectively connected to a first output terminal of the power converter and a common terminal of the first capacitor and the third resistor.

15. The auxiliary circuit of claim 10, wherein the voltage-controlled current source circuit is configured as one of a linear amplifier circuit, a switching conversion amplifier circuit, or a digital control amplifier circuit.

16. The auxiliary circuit of claim 10, wherein the voltage-controlled current source circuit comprises:
   a) a first error module configured to generate an error signal between input signals of the voltage-controlled current source circuit and determine whether the error signal satisfies a predetermined condition;
   b) a linear amplification module configured to generate switching control signals according to the error signal and a sampling signal of an output current of the voltage-controlled current source circuit when the error signal satisfies the predetermined condition; and
   c) a switch module configured to control operating states of switches in the switch module according to the switching control signals to generate and adjust the auxiliary current.

17. The auxiliary circuit of claim 10, wherein the voltage-controlled current source circuit comprises:
   a) a second error module configured to generate an error signal between input signals of the voltage-controlled current source circuit and determine whether the error signal satisfies a predetermined condition;
   b) a switching converter having an inductor, and being configured to generate and adjust the auxiliary current output by the voltage-controlled current source circuit;
   c) a current mode controller configured to generate a first signal according to the error signal and a sampling signal of an output current of the voltage-controlled current source circuit; and
   d) a pulse-width modulation (PWM) driving circuit configured to generate control signals of the switching converter according to the first signal when the error signal satisfies the predetermined condition.

18. The auxiliary circuit of claim 10, wherein the voltage-controlled current source circuit comprises:
   a) a third error module configured to generate an error signal between input signals of the voltage-controlled current source circuit;
   b) an ADC circuit configured to convert the error signal into a digital control signal; and
   c) a switch unit configured to control switching states of a corresponding switch in the switch unit according to the digital control signal to generate the auxiliary current.

19. The auxiliary circuit of claim 18, wherein the switch unit comprises a plurality of field-effect transistor modules connected in parallel, wherein the field-effect transistor module comprises:
   a) a switch transistor;
   b) a level conversion unit configured to convert a level of a corresponding digital control signal to generate a switching control signal for a corresponding switch transistor; and
   c) a driver configured to control switching states of the switch transistor according to the switch control signal.

20. A driving circuit, comprising the auxiliary circuit of claim 1, and further comprising:
   a) a power converter configured to receive an input voltage and generate an output signal to drive a load;
   b) a feedback control circuit configured to control switching states of switches in the power converter according to a feedback signal of an output signal of the power converter to adjust the output signal; and
   c) wherein the auxiliary circuit and the feedback control circuit are controlled independently.

* * * * *